United States Patent [19]

Burgess

[11] 4,256,293
[45] Mar. 17, 1981

[54] THROTTLE CONTROL DASH POT

[75] Inventor: Ronald R. Burgess, Corunna, Mich.

[73] Assignee: Tom McGuane Industries, Inc., Madison Heights, Mich.

[21] Appl. No.: 43,388

[22] Filed: May 29, 1979

[51] Int. Cl.³ .............................................. F16F 5/00
[52] U.S. Cl. ........................................ 267/123; 16/52; 123/320; 188/298; 188/314; 267/8 R
[58] Field of Search .............. 267/123, 126, 127, 129, 267/8 R, 128; 188/298, 314, 316, 315; 16/52; 123/97 B

[56] References Cited

U.S. PATENT DOCUMENTS

| 2,618,478 | 11/1952 | Conway | 267/34 X |
| 2,640,693 | 6/1953 | Magrum | 267/8 R |
| 2,732,038 | 1/1956 | Olson et al. | 267/123 X |
| 2,802,664 | 8/1957 | Jackson | 188/298 X |
| 3,052,328 | 8/1962 | Brueckner | 188/298 X |
| 3,116,917 | 1/1964 | Cramer | 267/127 |
| 3,180,369 | 4/1965 | Leader et al. | 188/298 X |
| 3,484,090 | 12/1969 | Mahoney | 267/127 X |
| 3,484,134 | 12/1969 | Townsend | 188/298 X |
| 3,868,912 | 3/1975 | Wagner et al. | 267/8 R X |
| 3,906,910 | 9/1975 | Szlaga, Jr. | 123/97 B X |

FOREIGN PATENT DOCUMENTS 395410  2/1933  United Kingdom .................... 188/314

Primary Examiner—George E. A. Halvosa
Attorney, Agent, or Firm—Barnes, Kisselle, Raisch & Choate

[57] ABSTRACT

A dash pot which functions to control a throttle throughout its movement and also functions as a throttle return spring comprising a cylindrical body in which a guide member and associated shaft are positioned with the shaft extending externally of the body and a chamber associated with the cylinder having a diaphragm defining one wall thereof. The chamber and cylinder are filled with an incompressible fluid and an orifice is provided between the chamber and the cylinder. A spring yieldingly urges the shaft inwardly. A check valve and orifice are provided in the body to restrict the flow of fluid as the guide member is moved inwardly and permit the relatively free flow of liquid from one side of the guide member to the other as the guide member and associated shaft are moved outwardly. The end of the shaft is connected to the throttle so that when the throttle is released by the operator of the vehicle, the return velocity of the throttle to idle position is controlled throughout its movement.

5 Claims, 6 Drawing Figures

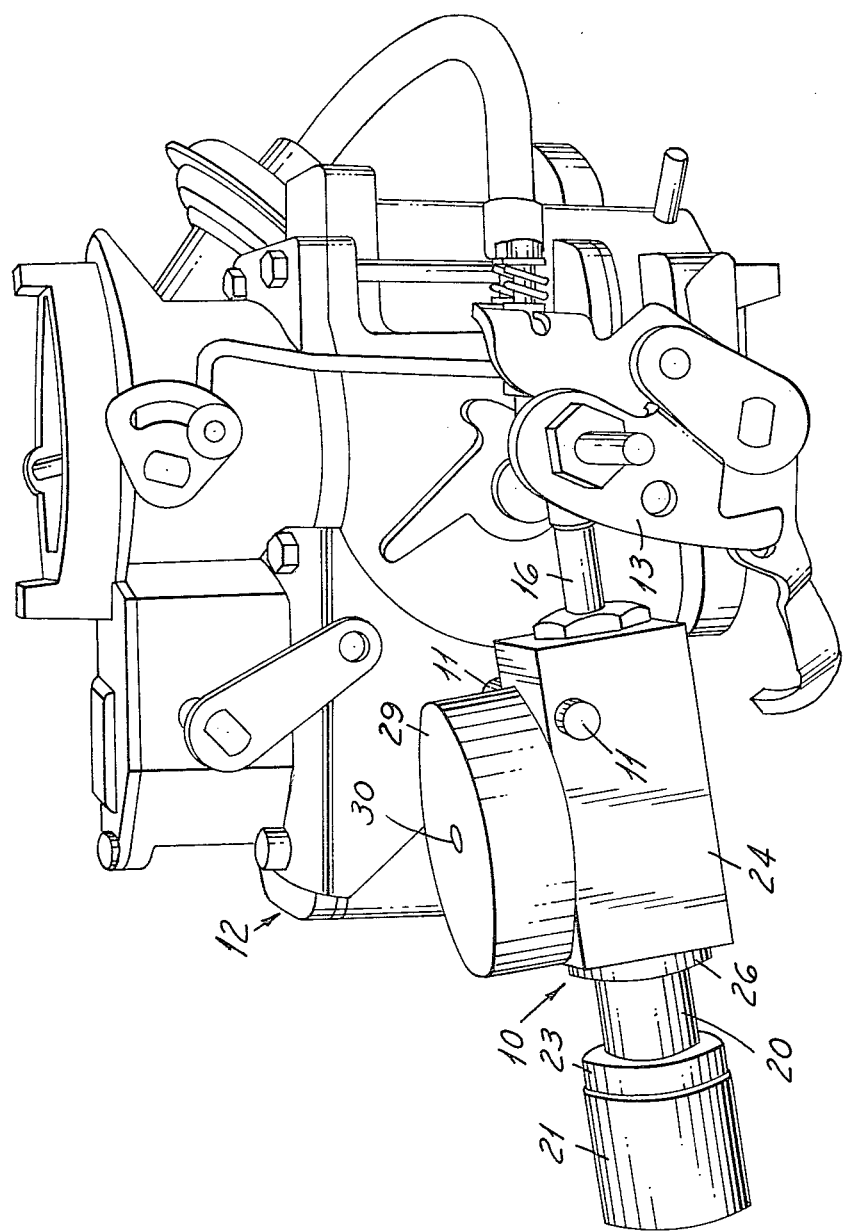

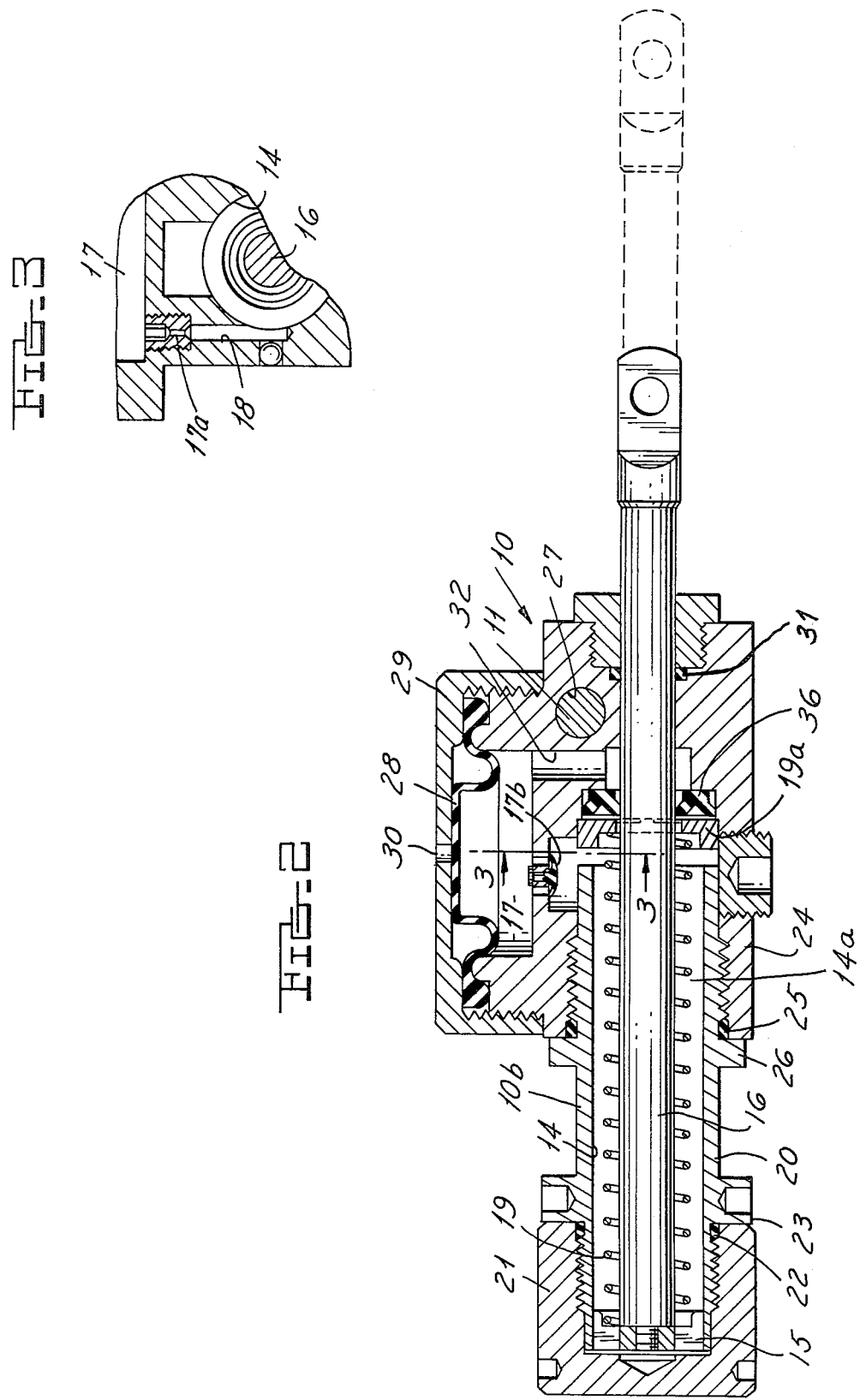

THROTTLE CONTROL DASH POT

This invention relates to dash pots and the associated carburetors.

BACKGROUND AND SUMMARY OF THE INVENTION

It has been common to provide a dash pot to control the closing of an automobile throttle during the latter part of the movement as the throttle approaches the idle position after the driver takes his foot off the gas pedal. Typical dash post are shown in U.S. Pat. Nos. 2,657,038, 2,862,702 and 2,894,740.

It has been proposed to control the return of the throttle to idle position from the fully open position throughout its movement in order to stabilize power train torque.

Accordingly among the objectives of the present invention are to provide a dash pot which can be present with a carburetor for controlling the movement of the throttle from a full throttle position to an idle position; which dash pot can be attached directly to the throttle linkage; which will provide the required dampening of the movement of the throttle; which will permit thermal variation without pressure build-up; and which will obviate the need for the conventional throttle return spring.

In accordance with the invention, the dash pot incorporates a cylinder, guide member and associated shaft, the shaft being connected directly to the throttle linkage and a spring urging the shaft inwardly to close the throttle. A chamber and associated diaphragm are provided in communication with the cylinder and the chamber and cylinder are filled with an incompressible fluid. An orifice controls communication between the chamber and the cylinder and a check valve meters the flow of the fluid between the cylinder and chamber so that the movement of the shaft is dampened as the shaft is moved inwardly and the shaft is permitted less restricted free movement outwardly against the action of the spring.

DESCRIPTION OF THE DRAWINGS

FIG. 1 is fragmentary side elevational view of a carburetor embodying the invention.

FIG. 2 is a longitudinal sectional view through the dash pot embodying the invention.

FIG. 3 is a fragmentary view taken along the line 3—3 in FIG. 2.

DESCRIPTION

Figure 4:
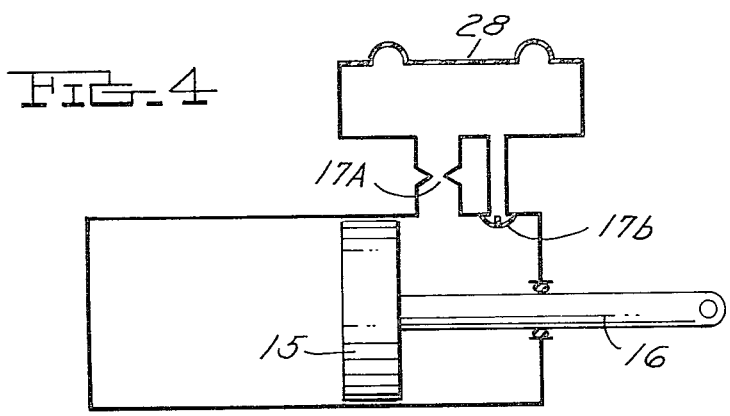
FIG. 4 is a schematic diagram of the dash pot embodying the invention.

Referring to FIG. 1, the dash pot 10 embodying the invention is adapted to be pivoted on a pin 11 extending outwardly from a carburetor 12 having the usual construction including a throttle crank arm 13 that is associated with the throttle.

Referring to FIG. 2, the dash pot 10 comprises a body that includes a cylinder 14, a guide member 15 in the cylinder 14, and a shaft 16 connected to guide member 15 and extending exteriorly for connection to the throttle crank 13. The body further includes a reservoir or chamber 17 that communicates with chamber 14a of cylinder 14 through an orifice 17a (FIG. 3) positioned in the passage 18 between the chamber 17 and the chamber 14a and umbrella type check valve 17b. A spring 19 is interposed between guide member 15 and a thrust member 19a.

More specifically, the body of the dash pot comprises a tubular member 20 that has a cap 21 threaded on one end thereof and compressing a seal 22 interposed between cap 21 and an annular portion 23 on member 20 and a second cap 24 threaded on the other end thereof and compressing a seal 25 interposed between cap 24 and an annular portion 26 on member 20. The second cap 24 includes a lateral opening 27 into which the pin 11 mounted on the carburetor extends. The cap 24 further includes an opening defining the chamber 17. A diaphragm 28 has its periphery compressed by a cap 29 threaded on the cap 24 to thereby close the chamber 17. An opening 30 vents the opposite side of the diagram to the atmosphere. The chamber 17 and cylinder 14 are filled with an imcompressible fluid such as silicone fluid.

One-way valve 17b restricts the flow of fluid from chamber 14a and into chamber 17 when the shaft 16 is moved inwardly while permitting relatively free flow of the fluid when the shaft 16 is moved outwardly or to the right as viewed in FIG. 2.

A seal 31 is provided in an annular recess in cap 24 and seals against shaft 16. Fluid from reservoir 17 passes freely to the seal through passage 32.

In use, the dash pot 10 is mounted on the pin 11 and end of the shaft 16 is connected to the crank arm 13. When the throttle pedal is depressed, the shaft 16 is moved against the action of the spring 19 outwardly, or to the right as viewed in FIG. 2, and fluid flows freely from the chamber 17 into chamber 14A. When the throttle is released, the spring 19 functions to return the throttle and, in turn, the shaft 16 to idle position or to the left as viewed in FIG. 2. During movement, the one-way valve 17b on the body closes forcing fluid to flow through orifice 17a from chamber 14a to chamber 17 and thereby functions throughout the movement to dampen the movement because the flow of fluid is restricted.

By providing the chamber 17 and the associated diaphragm, any expansion of the fluid because of varitions in temperature or the changing volume due to movement the piston rod are accommodated without increasing the pressure in the chamber 17.

FIG. 4 represents a schematic diagram of the dash pot embodying the invention, corresponding parts having corresponding numbers for purposes of clarity.

Figure 5:
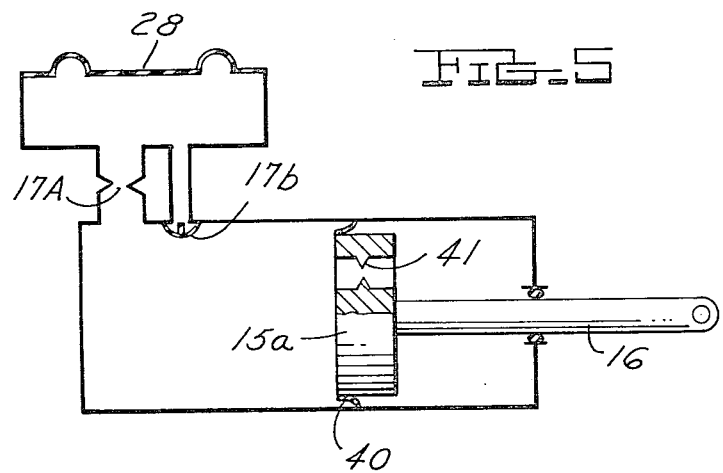
FIG. 5 is a schematic diagram of a modified form of dash pot.

In the modified form of dash pot shown in FIG. 5, the guide member 15 has been modified intoa piston 15a having a peripheral seal or check valve 40 and an orifice 41 in the piston. This construction provides a double acting function because of the orifice that is provided in each direction of movement of the shaft 16. The diaphragm 28 compensates for ambient pressure and thermal temperature variations. In the steady state, fluid pressure is at ambient pressure thereby minimizing leakage.

Figure 6:
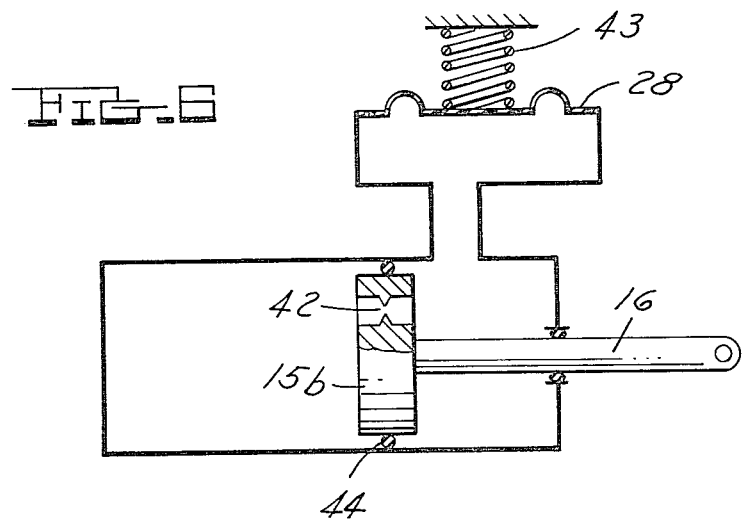
FIG. 6 is a schematic diagram of a further modified form of dash pot.

In the form of dash pot shown in FIG. 6, the guide member 15 is once again converted into a piston 15b with a double acting seal 44 at the periphery and an orifice 42 through the piston. In addition, the orifice 17a and one-way valve 17b have been eliminated. This system requires pressurized fluid in order to avoid cavitation and accordingly a spring 43 is provided to urge the diaphragm 28 inwardly. Although this system has fewer components, the possibility of leakage is increased since the steady state fluid pressure is above ambient.

In each of the forms shown in FIGS. 5 and 6, a reversed dash pot action is provided to control throttle opening as well as throttle closing.

I claim:

1. A dash pot for controlling a throttle throughout its movement and functioning as a throttle return spring comprising
   a body defining a cylinder,
   a guide member in said cylinder,
   said member including means permitting fluid to flow from one end of said cylinder to the other,
   a shaft connected to said guide member and extending externally of said body at one end of said body,
   a spring in said body urging said shaft inwardly of said body,
   means defining a chamber communicating with said cylinder at said one end of said body,
   a diaphragm forming one wall of said chamber and exposed to ambient pressure,
   and an orifice and check valve in said body interposed between said chamber and said cylinder at said one end of said body for metering said communication,
   said check valve being operable to open when the shaft is moved outwardly and thereby permit fluid to flow freely from the chamber to the cylinder,
   said check valve being operable to close and thereby force fluid flow through said orifice from the cylinder to the chamber when the shaft is moved inwardly,
   means on said body for pivotally mounting said body in association with a carburetor at a point adjacent said one end of said body,
   an incompressible fluid in said cylinder and said chamber.

2. The dash pot set forth in claim 1 wherein said body comprises a first tubular member,
   a first cap mounted on said one end of said tubular member to define said cylinder,
   a second cap mounted on the other end of said tubular member,
   said chamber forming a part of said first cap member,
   said first cap having an opening therein through which such shaft extends,
   sealing means between said first cap and said shaft,
   a third cap threaded on said first cap,
   said diaphragm being interposed between said third cap and said first cap,
   said orifice being positioned in said first cap.

3. The dash pot set forth in claim 2 including a passage extending from said chamber externally of said cylinder to the side of said sealing means between said first cap and said shaft.

4. The dash pot set forth in claim 1 wherein said check valve comprises an umbrella type valve.

5. The dash pot set forth in any of claims 1, 2 or 3 wherein said fluid flow permitting means associated with said guide member comprises a space between the periphery of said guide member and said cylinder.

* * * * *